(12) United States Patent
Emberling et al.

(10) Patent No.: US 6,246,422 B1
(45) Date of Patent: Jun. 12, 2001

(54) EFFICIENT METHOD FOR STORING TEXTURE MAPS IN MULTI-BANK MEMORY

(75) Inventors: Brian Emberling, San Francisco; Michael G. Lavelle, Saratoga, both of CA (US)

(73) Assignee: Sun Microsystems, Inc., Palo Alto, CA (US)

( * ) Notice: Subject to any disclaimer, the term of this patent is extended or adjusted under 35 U.S.C. 154(b) by 0 days.

(21) Appl. No.: 09/144,863

(22) Filed: Sep. 1, 1998

(51) Int. Cl.$^7$ ............................................ G06T 11/40
(52) U.S. Cl. .................... 345/552; 345/430; 345/538; 345/540
(58) Field of Search ............... 345/430, 507–509, 345/511, 513, 531, 552, 536–538, 540

(56) References Cited

U.S. PATENT DOCUMENTS

| 4,945,495 | | 7/1990 | Ueda .................................... 345/430 |
| 5,495,563 | * | 2/1996 | Winser ................................. 345/430 |
| 5,760,783 | * | 6/1998 | Migdal et al. ....................... 345/430 |
| 5,767,858 | * | 6/1998 | Kawase et al. ...................... 345/430 |
| 5,801,708 | * | 9/1998 | Alcorn et al. ....................... 345/430 |
| 5,815,157 | * | 9/1998 | Bowen ................................. 345/430 |

FOREIGN PATENT DOCUMENTS

| 0 438 194 | 7/1991 | (EP) ............................. G06F/15/72 |
| 0 747 860 | 12/1996 | (EP) ............................. G06T/15/10 |
| WO95/24682 | 9/1995 | (WO) ............................ G06F/12/00 |
| WO97/10572 | 3/1997 | (WO) ............................ G06T/15/10 |

OTHER PUBLICATIONS

Technical Reference: Texas Instruments TMS626162, TMS626812 16M–Bit Synchronous DRAM 1996, pp. 2–2 through 2–6.

Foley, et al., "Computer Graphics: Principles and Practice", $2^{nd}$. Edition, Addison–Wesley Publishing Company 1996, pp. 826–828.

Cirrus Logic Whitepaper: 3D Demystified: A Primer on 3D Graphics Technology, Sep. 1996, downloaded and printed on Jun. 28, 1998, from http:/www.cirrus.com/products/technologies.

* cited by examiner

*Primary Examiner*—Kee M. Tung
(74) *Attorney, Agent, or Firm*—Conley, Rose & Tayon, PC; Dan R. Christen

(57) ABSTRACT

A method for storing mip map series in a multi-bank texture memory is disclosed. Each mip map has a different size and represents a different resolution version of a texture map image that is to be mapped onto a three dimensional object comprising one or more polygons. To prevent page faults when accessing corresponding texels in consecutive mip maps, each mip map is divided in two halves. The halves are stored in different banks of the multi-bank texture memory. The banks used are alternated so that corresponding texels in consecutive mip maps are stored in different memory banks. Mip maps may be categorized as large or small, with all small mip maps after the first being stored in their entirety in one memory bank. Small mip maps are those that are equal to or smaller than the page size of the multi-bank texture memory. A computer system, graphics subsystem, and software program capable to efficiently store mip map series in a multi-bank texture memories are also disclosed.

27 Claims, 7 Drawing Sheets

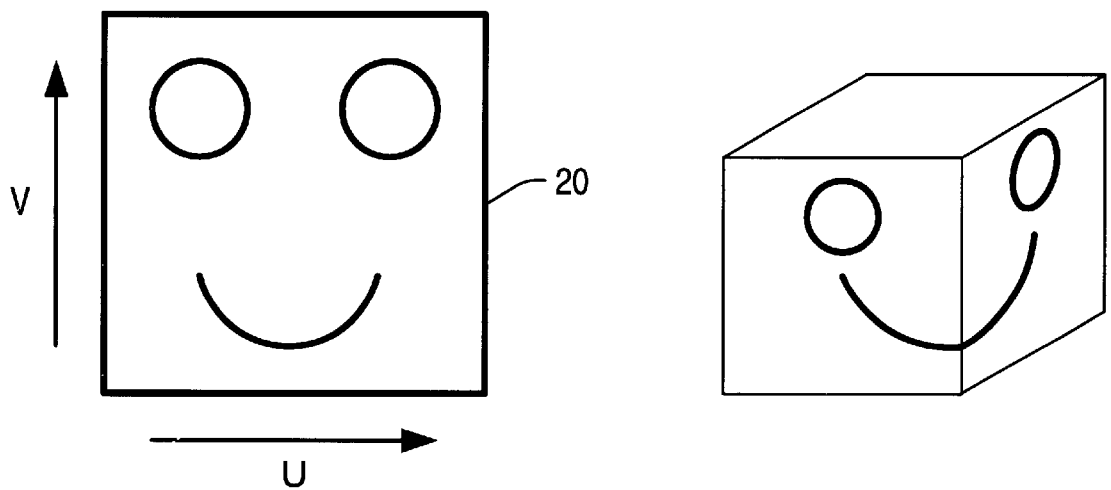
FIG. 1A
FIG. 1B
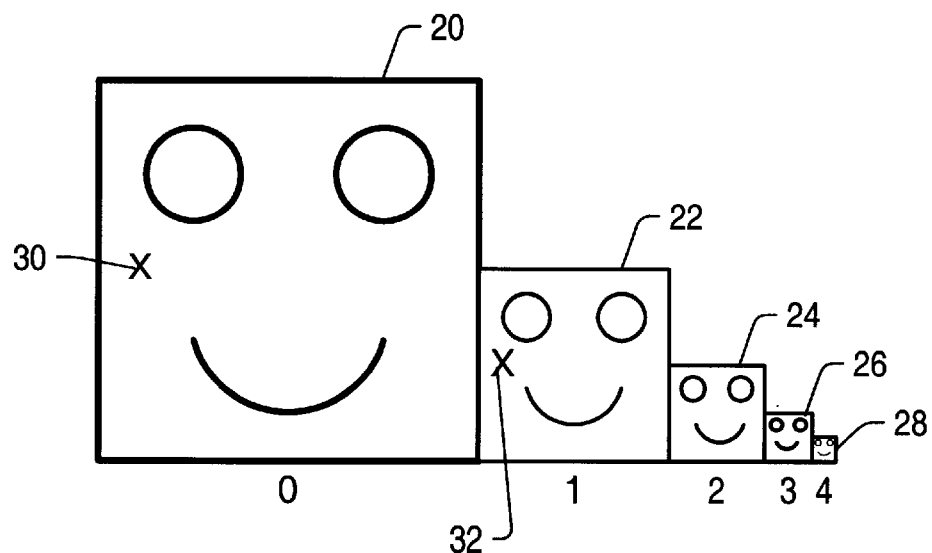
FIG. 2

EFFICIENT METHOD FOR STORING TEXTURE MAPS IN MULTI-BANK MEMORY

BACKGROUND OF THE INVENTION

1. Field of the Invention

The present invention relates to graphics subsystems in computer systems, and more particularly, to the use of texture memory for texture mapping.

2. Description of the Related Art

Modern computer systems are typically configured with graphics subsystems designed to remove some of the graphics burden from the system's central processing unit (CPU). The graphics subsystems act as the interface between the computer and the display device (e.g., a monitor). Since the graphics subsystems contain hardware optimized to perform graphics calculations, graphics application performance may be improved. In addition, since the CPU devotes less clock cycles to performing graphics tasks, non-graphics applications may also see improved performance.

In addition to improving performance, another goal of graphics subsystems is to increase the realism of objects that are displayed by the system. The problem of visual realism, however, is quite complex. Objects in the "real world" include an incredible amount of detail, including subtle variations in color, reflections, and surface irregularities.

A number of different approaches have been used to improve realism and add surface detail to objects that are displayed by computers. A simple approach involves the use of surface-detail polygons to show features (e.g., doors, windows, and lettering) on top of a base polygon (e.g., the side of a building). However, as the surface detail to be represented becomes more intricate, the number of polygons also increases. This in turn reduces performance because graphic subsystems are only capable of manipulating a limited number of polygons before performance is unacceptably degraded.

An alternate approach, known as "texture mapping", maps an image (called a "texture map") onto a surface. A texture map is an image which can be wrapped (mapped) onto a three dimensional (3D) object. An example of a texture map 20 is illustrated in FIG. 1A. Texture map 20 is defined as a collection of texture elements ("texels"), with coordinates U and V (similar to X and Y coordinates on the display or "screen space"). In FIG. 1B, an example of texture mapping is shown. As the figure illustrates, texture map 20 is mapped onto two sides of a three dimensional cube. Another example of texture mapping would be to map an image of a painting with intricate detail onto a series of polygons representing a vase. In many cases, texture mapping achieves more realistic results than the use of surface-detail polygons.

While texture mapping may result in more realistic scenes, awkward side-effects of texture mapping may occur unless the graphics subsystem can apply texture maps with correct perspective. Perspective-corrected texture mapping involves an algorithm that translates pixels from the bitmap texture image (i.e., texels) into display pixels in accordance with the spatial orientation of the surface.

In conjunction with texture mapping, many graphics subsystems utilize bilinear filtering, alpha blending, antialiasing, and mip mapping to further improve the appearance of rendered images. Bilinear filtering improves the appearance of texture mapped surfaces by considering the values of four adjacent texels in order to determine the value of the displayed pixel. Bilinear filtering may avoid the "blockiness" that results from simple point sampling when adjacent display pixel values are defined by a single texel. However, one potential drawback of bilinear filtering is that it requires more memory bandwidth that point sampling.

Alpha blending is a technique that controls the transparency of an object, allowing realistic rendering of translucent surfaces such as glass or water. Additional atmospheric effects that are found in rendering engines include fogging and depth cueing. Both of these techniques obscure an object as it moves away from the viewer. The fog effect is a special case of alpha blending whereby a texture with varying levels of translucency is blended with an object which then seems to disappear into a haze. Depth cueing achieves its effect by lowering the intensity of light on an object so that it appears less prominent as it recedes.

Aliasing refers to the jagged edges that result from displaying a smooth object on a computer display. Aliasing is particularly disconcerting at the edges of texture maps. Antialiasing (i.e., minimizing the appearance of jagged edges) avoids this distraction by reducing the contrast between the edge of an object and the color behind it. This is typically accomplished by adjusting pixel values at or near the edge.

Mip mapping involves storing multiple copies of texture maps, each digitized at a different resolution. When a texture mapped polygon is smaller than the texture image itself, undesirable effects may result. Mip mapping avoids this problem by providing a large version of a texture map for use when the object is close to the viewer, and smaller versions of the texture map for use when the object shrinks from view.

A mip map may be visualized as a pyramid of filtered versions of the same texture map. Each map has one-half the linear resolution of its preceding map, and has therefore one quarter the number of texels. The memory cost of this organization, where the coarsest level has only one texel, is $4/3$ (i.e., $1+1/4+1/16+\ldots$) the cost of the original map. The acronym "mip" stands for "multum in parvo", a Latin phrase meaning "many things in a small place". The mip map scheme thus provides pre-filtered textures, one of which is selected at run time for use in rendering. In general, this theoretical level will lie between two adjacent pre-calculated levels, and will therefore require interpolation to the theoretical level. Within each map, bilinear interpolation may be needed if the texel to be looked up is not exactly on the integer boundaries. Similar two-dimensional linear interpolations are computed in each mip map when scaled (u, v) values required for texture table lookup are not integer values. To assure continuity during animation, the effects of the four texels which enclose the scaled (u, v) values are considered, based upon their linear distances from the reference point in texel space. For example, if the scaled (u, v) values are (3.7, 6.8), the weighted average of texels (3, 6), (4, 6), (3, 7), and (4, 7) is taken.

Turning now to FIG. 2, a set of mip maps is shown. As the figure illustrates, each mip map is a two dimensional image, where each successive mip map is one half the size of the previous one. For example, if level 0 (i.e., texture map 20) is sixteen by sixteen texels, then level 1 (mip map 22) will be eight by eight texels, level 2 (mip map 24) will be four by four texels, level 3 (mip map 24) will be two by two texels, and level 4 (mip map 28) will be a single texel. Each subsequent mip map is one half the dimension of the previous mip map. Thus, each subsequent mip map has one quarter the area, number of texels, and resolution of the previous mip map. Note, however, that other ratios are also possible and that mip maps need not be square.

Tri-linear filtering may be used to smooth out edges of mip mapped polygons and prevent moving objects from displaying a distracting 'sparkle' resulting from mismatched texture intersections. Trilinear filtering involves blending texels from two neighboring mip maps (e.g., blending texels from mip map 20 and mip map 22). The texel addresses in the neighboring mip maps are related by their addresses. For example, a particular texel at address (U,V) in level N corresponds to the texel at address (U/2, V/2) in level N+1. This is represented by texels 30 and 32 in the figure (each marked with an "x").

To improve texture mapping performance, graphics systems may store mip maps in dedicated memory. The memory may be part of main system memory or may be implemented as dedicated texture memory on a graphics subsystem board. Since this memory must be low latency and have a high bandwidth, dynamic random access memories (DRAMs) do not typically suffice. Instead, more expensive memories with faster access times may employed, e.g., synchronous DRAMs (SDRAMs).

Turning now to FIG. 3, an example of a texture map SDRAM 40 is shown. As illustrated in the figure, SDRAM 40 comprises two independent banks of memory cells, i.e., memory banks 42 and 44 (also referred to herein as "bank A" and "bank B"). Each bank comprises a plurality of rows (e.g., rows 46 and 48). While SDRAMs may vary in size, a typical row may store 512 bytes of data. Note that the term "page" is synonymous with "row" and is used in phrases like "page-miss" (an attempt to read from a row which not currently active). Each bank may only have one row active at a particular time (see rows 46 and 48), and a bank must be deactivated for a predetermined time period before a different row may be activated.

The cost of SDRAMs necessarily limit the amount of memory that may be included in a graphics subsystem. In addition to size limitations, other factors may further complicate the process of storing mip maps into memory. For example, during trilinear filtering, it is often desirable to access neighboring mip maps (e.g., level 0 and level 1) at the same time (or one immediately after the other).

Turning now to FIG. 4, the difficulties in implementing this feature are illustrated. In the example storage method shown in the figure, memory banks 42 and 44 are treated as a single linear array. Each mip map is stored in scan line order (i.e., with the U coordinate varying most rapidly, then the V coordinate, then the mip map level). While simple to implement, this method has drawbacks. As previously noted, during trilinear filtering a particular texel may be read from a level and then blended with a corresponding texel from a neighboring level. This may cause page faults if the configuration from FIG. 4 is used. For example, a first texel 50 at address (U,V) within level 0 in memory bank 42 may be read during a first clock cycle. This read actives row 60 in memory bank 42. During the next clock cycle, the graphics subsystem attempts to read the corresponding texel 52 at address (U/2, V/2) in level two. However, since the desired texel 52 is in a different row 62 within memory bank 42, a page miss occurs and memory bank 42 must be deactivated for a predetermined time period before row 62 may be activated.

For these reasons, a method for efficiently storing texture maps is desired. In particular, a method allowing rapid access to corresponding texels in neighboring mip map levels is needed.

SUMMARY OF THE INVENTION

The problems described above are in large part solved by a method for storing texture maps in a multi-bank memory that divides mip maps into halves and then stores the halves in alternative memory banks. By storing corresponding texels from neighboring mip maps in different memory banks, time consuming page faults may advantageously be reduced.

In one embodiment, a method for storing texture maps in a multi-bank memory comprises reading a plurality of mip maps from a main system memory. Each mip map has a different size and may be read in sequence from largest to smallest. Each mip map is divided into a left portion and a right portion. These portions are then stored into alternating memory banks within the multi-bank memory such that each mip map's left portion and right portion are stored in different memory banks. Thus, corresponding portions of neighboring mip map levels are stored in different (e.g., alternating) memory banks.

In some embodiments, the mip maps may be categorized as being either large or small, wherein large mip maps are those having sizes larger than the page size of the memory banks. Mip maps after the first small mip map may be stored in their entirety in a single memory bank. This may advantageously speed certain types of filtering while still reducing page faults. Alternatively, the small mip maps may be stored in their entirety in alternating memory banks.

A graphics subsystem is also contemplated. In one embodiment, the graphics subsystem may comprise a scaling means and a pair of memory banks. The memory banks each have a plurality of memory rows or pages. The scaling means is configured to generate a plurality of mip maps, each mip map having a different size and each having a left portion and a right portion. The scaling means may be coupled to the memory banks and may be configured to store the left and right portions into alternating memory banks. The portions are stored such that each mip map's left portion and right portion are stored in different memory banks, and such that sequential left portions and right portions are stored in different memory banks. As described above, the graphics subsystem may be configured to divide large mip maps while storing small mip maps after the first without dividing them.

A computer system is also contemplated. In one embodiment, the computer system comprises a host CPU, a main system memory, and a graphics subsystem. The graphics subsystem may comprise a texture memory (having at least two memory banks), and storage logic coupled between the texture memory and the main system memory. The storage logic is configured to receive a plurality of mip maps from the main system memory, wherein a subset of the mip maps are large (i.e., they will not fit within a single page in the memory banks), and wherein the remaining mip maps are small mip maps. The storage logic may be configured to split large mip maps (and the first small mip map) into left and right portions and store them in alternating memory banks such that each large mip map's left portions and right portions are stored in different memory banks.

A software program embodied on computer readable media is also contemplated. In one embodiment, the program may comprise a first plurality of instructions configured to read a particular mip map from a series of mip maps. A second plurality of instructions may be configured to divide the particular mip map into left and right halves. A third plurality of instructions may be configured to store the halves in different memory banks of a multi-bank texture memory. In one embodiment, the first, second, and third pluralities of instructions are configured to repeat a predetermined number of times. The first plurality of instructions may also be configured to read a new mip map from the series of mip maps each repetition, and the third plurality of instructions may be configured to store the left and right halves such that the left and right halves of consecutive mip maps are stored in different memory banks. The software may further comprise a fourth plurality of instructions configured to examine the mip map read by the first plurality of instructions. The fourth plurality of instructions may be configured to store the mip map in a single memory bank in its entirety if the mip map is not the first mip map of the series that is smaller than the size of a single memory bank within the multi-bank texture memory.

BRIEF DESCRIPTION OF THE DRAWINGS

Other objects and advantages of the invention will become apparent upon reading the following detailed description and upon reference to the accompanying drawings in which:

FIG. 1A is an illustration of a sample texture map image.

FIG. 1B is an illustration of a three dimensional cube texture mapped with the sample texture map image from FIG. 1A.

FIG. 2 is a diagram illustrating an exemplary series of mip maps.

Figure 3:
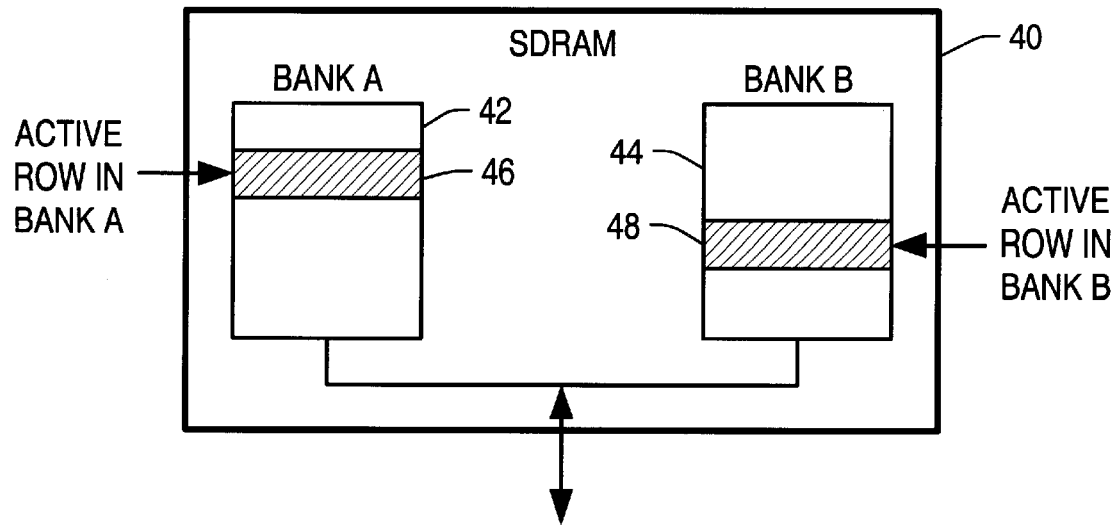
FIG. 3 is a block diagram illustrating an exemplary SDRAM.
Figure 4:
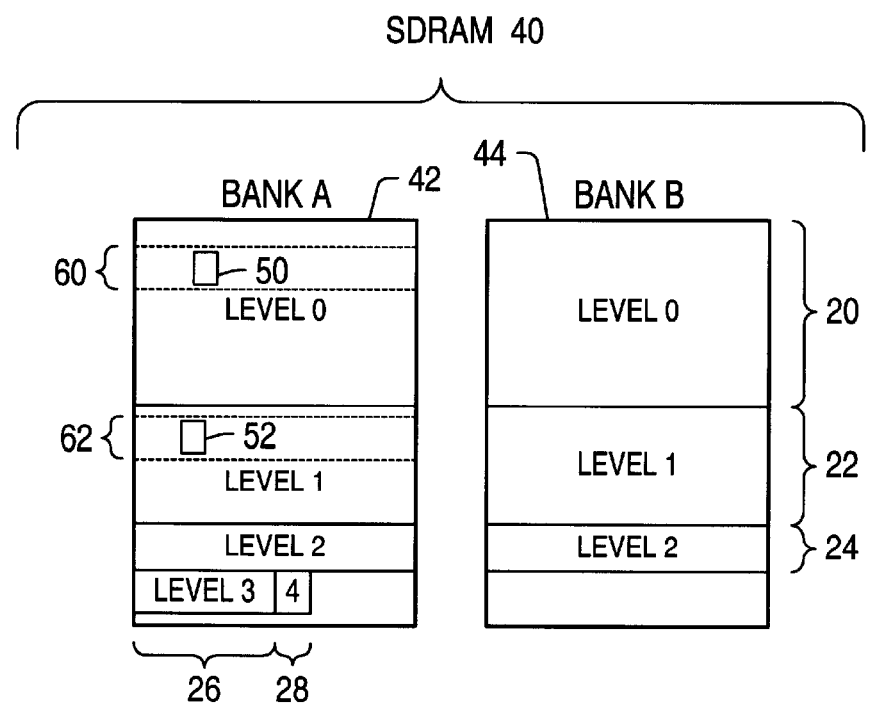
FIG. 4 is a block diagram of one linear packing method for storing a series of mip maps into an SDRAM.

While the invention is susceptible to various modifications and alternative forms, specific embodiments thereof are shown by way of example in the drawings and will be described in detail herein. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Figure 5:
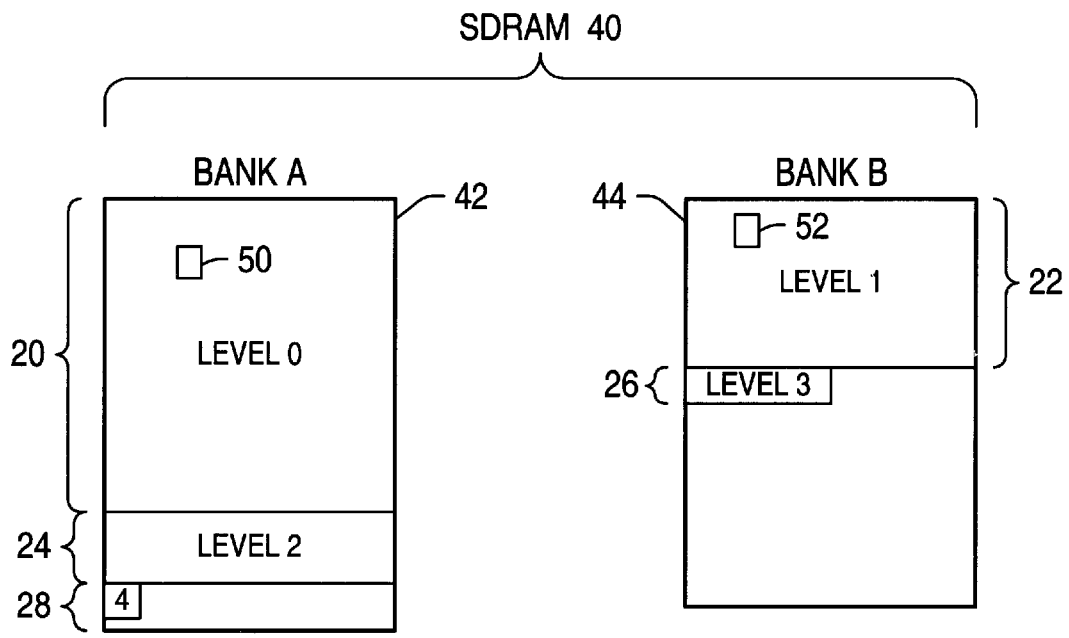
FIG. 5 is a block diagram of one alternative method for storing a series of mip maps into an SDRAM.

Turning now to FIG. 5, a method allowing access to corresponding texels in neighboring mip map levels is illustrated. The figure illustrates an SDRAM having two memory banks 42 and 44. In this embodiment, each mip map 20–28 is stored in alternating banks. For example, the first mip 20 (i.e., level 0) is stored entirely within bank 42. The next mip map 44 (i.e., level 1) is stored entirely within bank 44. The third mip map 24 (i.e., level 2) is stored entirely within bank 42. This alternation continues until all mip maps are stored. Advantageously, performance may be enhanced because neighboring mip maps are placed in different memory banks. This may result in less page faults. For example, a first texel 50 at address (U,V) within level 0 in memory bank 42 may be read during a first clock cycle. During the next clock cycle, the graphics subsystem may read the corresponding texel 52 at address (U/2, V/2) from memory bank 44 without a page fault.

This method, however, does have some drawbacks. In particular, the memory banks are not packed evenly. The total number of texels stored in each bank is shown in Table 1.

TABLE 1

| Bank 42 | Bank 44 |
|---|---|
| Level 0: 16 × 16 = 256 texels | Level 1: 8 × 8 = 64 texels |
| Level 2: 4 × 4 = 16 texels | Level 3: 2 × 2 = 4 texels |
| Level 4: 1 × 1 = 1 texel | Total: 68 texels |
| Total: 273 texels | |

As the table illustrates, assuming a starting bit map of sixteen by sixteen texels, a mismatch of close to four-to-one is apparent. This gross mismatch may waste memory and may increase the difficulty of memory management.

Figure 6:
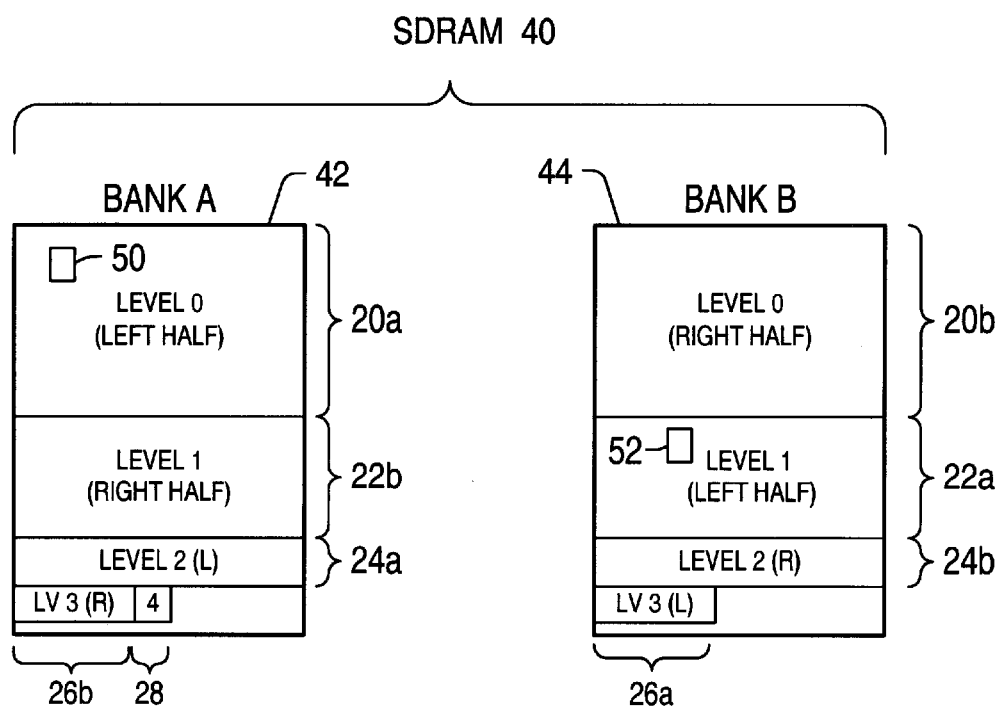
FIG. 6 is a block diagram of another alternative method for storing a series of mip maps into an SDRAM.

Turning now to FIG. 6, one embodiment of another method for storing mip map series is illustrated. This embodiment allows access to corresponding texels in neighboring mip map levels while providing for somewhat more even memory usage across memory banks 42 and 44. First, each mip map 20–28 is divided in half along its U axis (i.e., divided into "left" and "right" halves). These halves are then stored in stored in alternating banks. For example, the left half 20a of the first mip 20 (i.e., level 0) is stored within bank 42. The right half 20b is stored in bank 44. For the next mip map 44 (i.e., level 1), the left half 22a is stored in bank 44, while the right half 22b is stored in bank 42. This process continues until all the mip maps in the series are stored.

Advantageously, this embodiment may prevent page faults as in the previous embodiment. For example, if texel 50 at address (U,V) within level 0 in memory bank 42 is read during a first clock cycle, then the corresponding texel 52 at address (U/2, V/2) may be read from memory bank 44 during the next clock cycle without a page fault. A page fault is avoided because corresponding texels are stored in different banks. Note, corresponding texels in different layers will typically be on the same half of their respective mip maps (i.e., both left or both right, not one left, one right). By alternating which bank left and right halves are stored, the likelihood of page faults occurring may be reduced. Another potential advantage of this embodiment is that memory usage may be more evenly spread across memory banks 42 and 44.

Note, the mip maps may be divided in a number of different ways. For example, they may divided into halves along the u-axis (i.e., into left and right halves or portions). Similarly, they may be divided into halves along the v-axis (i.e., into top and bottom halves or portions). Note, in some embodiments the mip maps may not necessarily be divided equally, e.g., the first portion may be larger or smaller than the second portion. In other embodiments, the mip maps may be divided into portions using other criteria (e.g., along the line u=v).

Figure 7:
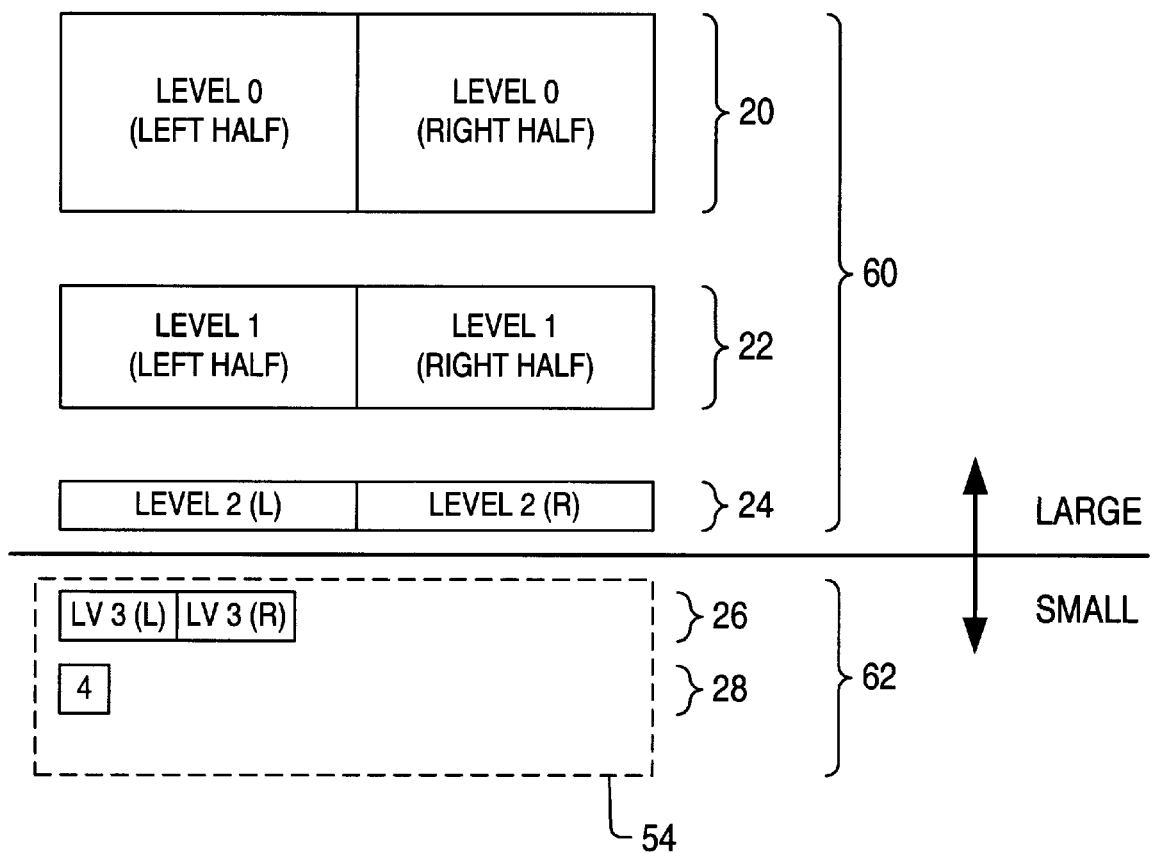
FIG. 7 is a block diagram illustrating the difference between large and small mip maps.

In some embodiments, small mip maps may be treated differently than large mip maps. Small mip maps are mip maps that will fit into a single row in a memory bank without being split. For example, assuming the previous sequence of mip maps, (i.e., level 0=16×16, level 1=8×8, level 2=4×4, level 3=2×2, and level 4=1×1), and assuming memory banks 42 and 44 each have rows capable of storing four texels, then mip map 26 (level 3) and mip map 28 (level 4) are "small". This distinction is illustrated in FIG. 7. Since each texture map is one quarter the size of the preceding one, the first mip map that fits entirely into one page, and all subsequent mip maps, can be fit into two rows (indicated by block 54). This is termed the "split point" (i.e., the level at which the mip map finally fits into one row). Mip maps 60 are above this point and are termed "large", while mip maps 62 are below this point and are termed "small".

In one embodiment, the first small mip map (i.e., the largest small mip map) is the last one which is split in half and stored in separate memory banks. All subsequent mip maps may then be stored in their entirety in either bank 42 or 44. This is illustrated in FIG. 6, where mip map 28 is stored entirely within bank 42. This configuration allows all small mip maps (after the first small mip map) to be accessed with one row access (i.e., without page faults). This may be particularly advantageous for bilinear filtering. Bilinear filtering typically involves reading four texels from the same mip map. It may be more efficient to access one row and read all four texels (e.g., in a single burst mode access), than to read texels from two separate banks.

Figure 8:
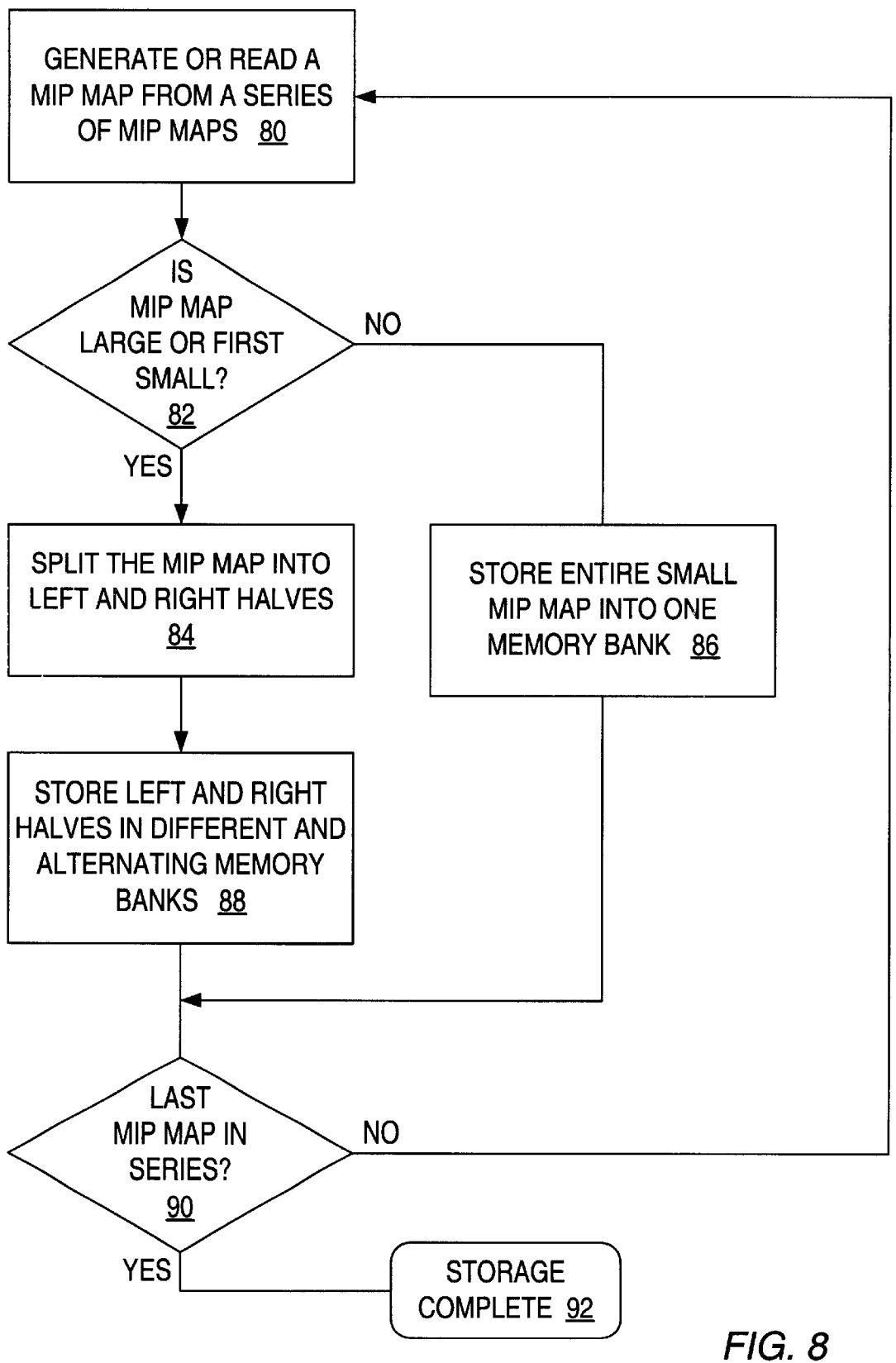
FIG. 8 is a flowchart illustrating one embodiment of a method for efficiently storing mip maps in a multi-bank texture memory.

Turning now to FIG. 8, a flowchart of this method is disclosed. First, a mip map is read from a series of mip maps stored in the computer system's main system memory (step 80). Alternatively, the graphics subsystem could read a single texture map image and calculate the series of mip maps itself. Regardless of which method is used, once the series of mip maps is available and the first mip map is read, the mip map (or a counter) is examined to determine whether the mip map is large or the first small mip map (step 82). If the mip map is large or the first small mip map, then it is divided into two portions or halves (step 84). These halves are then stored into alternating banks of the graphic system's texture memory (step 84). If the mip map was the final mip map in the series (step 90), then storage is complete (step 90). If not, the process repeats. When a small mip map is read (excluding the first small mip map), the entire small mip map may be stored in a single memory bank (step 86). As previously noted, other embodiments are possible and contemplated. For example, in one embodiment the graphics subsystem may be configured to ignore mip map size and simply split all mip maps. In another embodiment, small mip maps may be stored in their entirety in alternating memory banks. Further note that in some embodiments the mip maps may be split into other fractional components, e.g., quarters or thirds, and memories with more than two banks may also be used.

Figure 9:
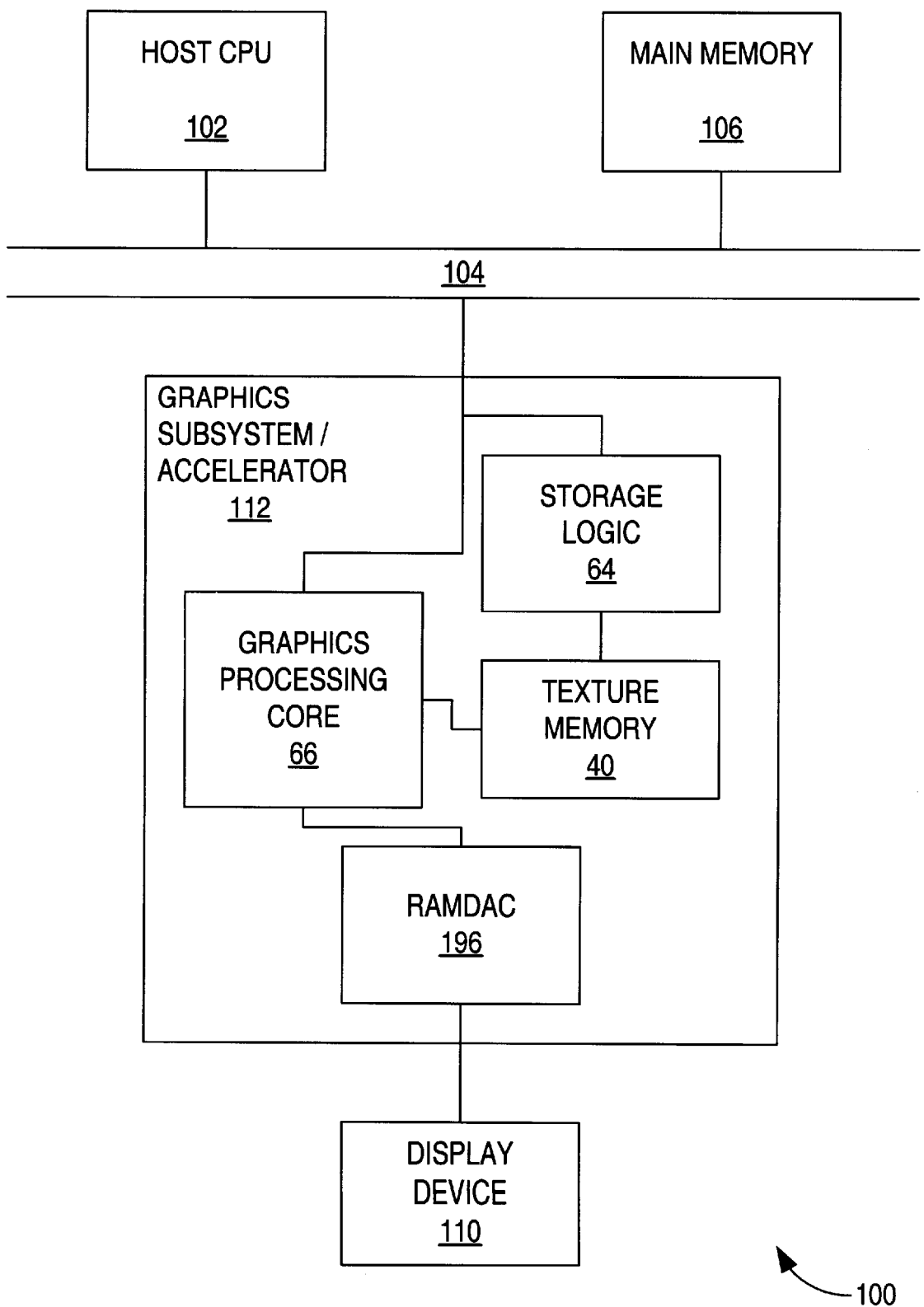
FIG. 9 is a diagram showing one embodiment of a computer system having a graphics subsytem capable of performing the method from FIG. 6.

Exemplary Embodiment of a Computer System p Turning now to FIG. 9, a simplified block diagram of one embodiment of a computer system configured to use the disclosed graphics subsystem is shown. Elements of the computer system which are not necessary for an understanding of the present invention are not shown for convenience. As shown, the computer system 80 includes a central processing unit (CPU) 102 coupled to a high speed bus or system bus 104. A system memory 106 is also coupled to the system bus 104.

The host processor 102 may be any of various types of computer processors, multi-processors and CPUs. The system memory 106 may be any of various types of memory subsystems, including random access memories and mass storage devices. The system bus or host bus 104 may be any of various types of communication or host computer buses for communication between host processors, CPUs, and memory subsystems, as well as specialized subsystems.

A 3-D graphics subsystem 112 is coupled to high speed memory bus 104. The graphics 112 may be coupled to bus 104 by, for example, a cross bar switch or other bus connectivity logic. It is assumed that various other peripheral devices, or other buses, may be connected to high speed memory bus 104, as is well known in the art. Graphics subsystem 112 may be coupled to any combination of various buses. As shown, a video monitor or display device 110 is also connected to 3-D graphics subsystem 112.

CPU 102 may transfer information to and from the graphics subsystem 112 according to a programmed input/output (I/O) protocol over the host bus 104. Alternately, graphics subsystem 112 may access memory subsystem 106 according to a direct memory access (DMA) protocol or through intelligent bus mastering.

Computer system 100 is configured to perform texture mapping for one or more polygons specified by a graphics application program executing on host processor 102. Host processor 102 sends the polygons to graphics subsystem 112 via host bus 104. The corresponding texture map is also conveyed with each of the polygons. Each polygon conveyed to graphics subsystem 112 is conveyed to a graphics processing core 66 for texture mapping and rendering. The texture map is conveyed to storage logic 64 for eventual storage in texture memory 40 as described above. In one embodiment, host CPU 102 calculates a series of mip maps from the texture map and conveys these to storage logic 64 in order from large to small. In another embodiment, only the original texture map is conveyed to graphics subsystem 112, which then calculates the mip map series and conveys the series to storage logic 64 for eventual storage in texture memory 40 as described above. Once the polygons are texture mapped and rendered, they are conveyed to RAM-DAC (RAM digital-to-analog-converter) for output to display device 110.

Figure 10:
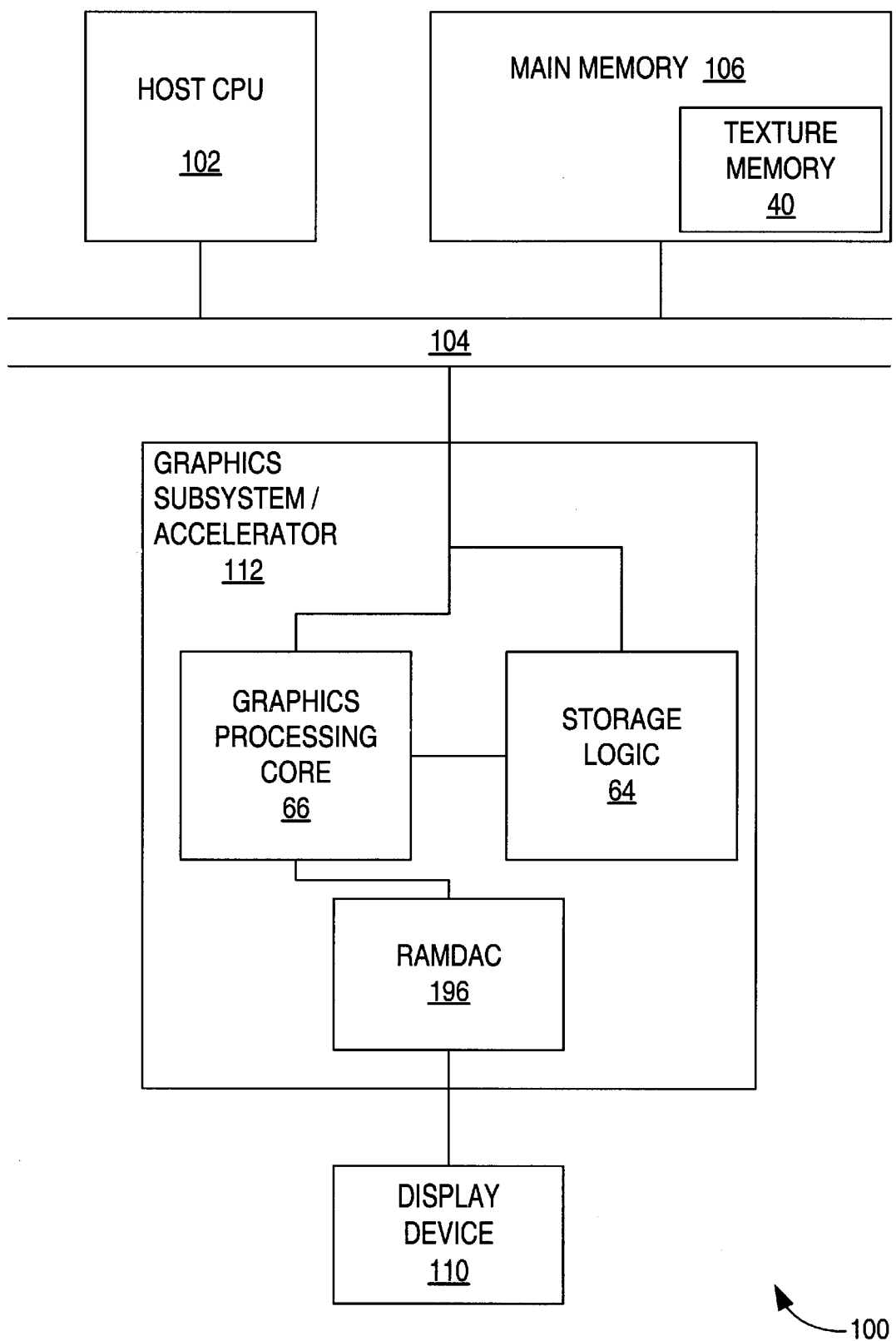
FIG. 10 is a diagram showing another embodiment of a computer system having a graphics subsytem capable of performing the method from FIG. 6.

Note that other configurations of computer system 100 and graphics subsystem 112 are possible depending upon the particular implementation. For example, in one embodiment of computer system 100, texture memory 40 may be implemented as part of main memory 106. This embodiment is shown in FIG. 10. In another embodiment, host CPU 102 may be configured to calculate the mip map series from the initial texture map image and then divide the mip maps into halves and store them in texture memory 40. In this embodiment, some or all of the functionality of storage logic 64 may be replaced by CPU 102 and appropriate software. Note that the methods for storing mip map series described above may be embodied in hardware (e.g., storage logic 64) or software embodied on computer readable media, e.g., a device driver for graphics subsystem 112, a dynamically linked library (DLL), or within a microcode ROM within graphics subsystem 112. Further note that while the examples herein describe texture memories with two banks, other configurations are also possible. For example, in one embodiment, texture memory 40 may have four memory banks. More details of additional mip mapping features that may be incorporated into computer system 100 and or graphics subsystem 112 are discussed below.

Mip Map Implementations

Mip maps are particularly useful when the textured image is compressed onto a triangular surface, an operation called "minification". As a result, several texels in the textured image may be compressed onto a single pixel. It may thus be useful to calculate a weighted average of these texels to generate each pixel value. Otherwise, the textured image may appear aliased. This effect may be particularly problematic during animation. If all the compressed texels are not considered (e.g., a point-sampling technique is used), the texture color may be quantitized to a single texel value. Since this texel value may change between frames of animation, unacceptable flashing and other visual defects may result. The amount of degradation varies in accordance with the texture pattern and the amount of minification.

The use of mip map levels is advantageous in that computing which texels are compressed under a single pixel is circumvented. Instead, the amount of compression is determined, which is used to select one of the mip map levels. Typically, this compression value lies between two adjacent pre-computed mip map levels, requiring interpolation of the texel values in each of the two mip maps. For example, the compression value my correspond to a mip map level of 2.4. In one embodiment, the pre-computed level 2 mip map may be used to determine texel values. In a different embodiment, the texel values from levels 2 and 3 may be combined using a weighted average (60% of level 2 values and 40% of level 3 values).

In one embodiment, texel compression may be computed by floating point processors within graphics processing core 66 for each vertex of the polygons generated by host processor 102. The per-pixel compression values may then be linearly interpolated from the vertex values.

As described above, CPU 102 provides a plurality of pre-calculated mip map levels (five, in one embodiment) to graphics subsystem 112. Typically, however, the theoretical mip map level determined from compression values lies between two pre-computed levels. In order to provide smooth pixel transitions during animation, then, graphics subsystem 112 linearly interpolates between two pre-computed levels.

Since each map level is one half the linear dimension of the previous level, for a given texel compression value C (calculated as above), the theoretical level is:

$$\text{maplevel} = \log_2 C.$$

To allow the possibility of an original 1024×1024 texture map being compressed in a single pixel, eleven integer and five fractional bits are used for C in one embodiment (denoted as 11.5 bits).

Typically, the theoretical map level will have a fractional component. In such a case, a determination is made of the two adjacent mip levels that bracket the theoretical level, followed by interpolation between them with a merging factor. The merging factor $m_f$ and the near mip map level nl are given by the following equations:

$$nl = \log_2 C$$

and $$m_f = \frac{C - 2^{nl}}{2^{nl}}.$$

The merging factor $m_f$ is the linear fractional distance between the levels nl and (nl+1) (the linear distance between the two adjacent levels is $2^{nl}$. More accurately, it is expressed as the five least-significant fractional bits of:

$$mf = (C - (1 << (nl+5))) >> nl.$$

In one embodiment, $nl = \log_2 C$ may be computed as the bit position of the first non-zero bit in the integer part of C, counting bit 0 as the right most bit. In one embodiment, there are five pre-computed levels of detail (and thus, five mip map levels). However, for a texture map of 1024×1024, there are actually a total of eleven levels. Thus, these extra six levels must also be addressable for more accurate anti-aliasing.

Texture Table Generation

After u and v are determined by division ($u = u_h/w_h, v = v_h/w_h$), the respective integer portions are used to look up a texel value from the texture map, while the fractional portion may be used for bilinear interpolation. At level 0, the integer parts of u and v, u_int and v_int, may be used as indices into a two-dimensional texture array. At level m, the corresponding indices are computed as (u_int>>m), and (v_int>>m), and the fractional values at level m are the five least significant of (u>>m) and (v>>m).

Anti-aliasing Options

In one embodiment, computer system 100 may be configured to support five XGL options allows for sampling or interpolating mip map levels. XGL is a graphics API (Application Program Interface) comprising a set of routines, protocols, and tools for building applications using computer system 100's graphics resources. Two of these options are for point sampling mip level 0, or the level nearest to the theoretical level. The third option deals with linear interpolation between point-sampled texels at the two mip map levels that bracket the theoretical level. The fourth option involves bilinear interpolation between four texels on the mip map level closest to the theoretical level. The fifth option deals with trilinear interpolation, which requires a final linear interpolation between the bilinear results on the two mip map levels that bracket the theoretical level. The interpolation between two mip maps is not performed if the mip map compression is less than or equal to 1.0, even if the application has selected such an option, since no mip maps more detailed than the level 0 map.

Point Sampling Options

If texel values are to be read from the level 0 mip map, the rounded values of scaled u and v:

$$T = T[u_{round}, v_{round}]_0.$$

If the nearest map level is to be used (e.g., level 2 for compression value 2.4), the merging factor is interrogated. If it is less than half, then $$T = T[(u >> nl)_{rounded}, (v >> nl)_{rounded}]_{nl}$$

else $$T = T[(u >> (nl+1))_{rounded}, (v >> (nl+1))_{rounded}]_{nl+1}.$$

Linear Interpolation Option

This option is used for merging two point samples, one from the near level, nl, and one from the next farther level, fl, to the theoretical level lying between these two. Let $T_n$ and $T_f$ represent the texel values from near and next farther levels. Then $$T_n = T[(u >> nl)_{rounded}, (v >> nl)_{rounded}]_{nl}$$

and $$T_f = T[(u >> (nl+1))_{rounded}, (v >> )(nl+1))_{rounded}]_{fl}.$$

The final merged result is:

$$T = T_n \cdot (1.0 - m_f) + T_f \cdot m_f$$

Since point-sampling is used, the fractional texel indices are discarded. It is noted that in one embodiment, 1.0 is actually represented in the binary form as 1.00000, with five fractional bits. On the other hand, $m_f$ contains only five bits of fraction with its integer part as zero.

Bilinear Interpolation Option

This option is used for taking the weighted average of four texels from a single map (level 0 or the map level closest to the theoretical level in different embodiments). Let (uint, vint) represent the integer portion of texel indices at the current mip map level, while (ufrac, vfrac) represent the fractional components (including the right shift adjustment from the values at level 0). Then the bottom two texels are (uint, vint) and (uint+1, vint). Interpolating between them gives $$T_{bot}=T[u_{int},v_{int}]\cdot(1.0-u_{frac})+T[u_{int}+1,v_{int}]\cdot u_{frac}.$$

Similarly, the top two texels are (uint, vint+1) and (uint+1, vint+1). Interpolating between them gives $$T_{top}=T[u_{int},v_{int}+1]\cdot(1.0-u_{frac})+T[u_{int}+1,v_{int}+1]\cdot u_{frac}.$$

Finally, merging these two values, the final texel result is given by $$T=T_{bot}\cdot(1.0-v_{frac})+T_{top}\cdot v_{frac}.$$

Tri-linear Interpolation Option

This is the most comprehensive option, involving eight samples, four from each of the near and far mip map levels. Bilinear interpolation is used at each of these two map levels, and the final linear interpolation involves the use of the merging function, $m_f$.

$$T=T_n\cdot(1.0-m_f)+T_f m_f$$

Merging Options

Once the texture components for a pixel have been computed, we still have to compute the textured color. This rendering step involves modulating, replacing, decaling, or blending the sampled texel data into a final color value. The OpenGL notation is used herein to indicate the required operations. $C_f$ and $A_f$ represent the interpolated color and alpha values at the pixel fragment. The sampled texel values are represented by $L_t$ for a single channel, $L_t$ and $A_t$ for a two-channel texture, $C_t$ (three color components) for a three-channel texture, and $C_t$ and $A_t$ for a four-channel texture. The output color and alpha values are represented by $C_v$ and $A_v$, respectively.

Modulation

This mode can be used for modulating the object color. For example, with one channel texture, modulate mode could create a ripple effect to simulate the surface of an orange. The color and alpha values are $$C_v=L_t\cdot C_f$$

and $$A_v=A_f.$$

The $C_v$ equation is made up of three separate equations for the red, blue, and green components.

In the two channel mode, the color and alpha values are given by $$C_v=L_t\cdot C_f$$

and $$A_v=A_t\cdot A_f.$$

In three-channel mode, each of the three color channels is multiplied by the corresponding component from the texture table:

$$C_v=C_t\cdot C_f$$

and $$A_v=A_f.$$

This can be used for texture lighting, where the texture color serves as the object diffuse color.

For the four channel case, alpha is also multiplied:

$$C_v=C_t\cdot C_f$$

and $$A_v=A_t\cdot A_f.$$

Replacement

In this mode, the sampled texture replaces the interpolated color value, and alpha is not affected:

$$C_v=C_t$$

and $$A_v=A_f.$$

Decaling

This mode is available only with four channels. It blends the interpolated color and the sampled texture color, using the alpha channel of texture:

$$C_v=(1-A_t)\cdot C_f+A_t\cdot C_t$$

and $$A_v=A_f.$$

This mode may be used for translucent texture effects. It may also be used to create the effect of a non-rectangular raster image by assigning different values to the alpha components in the texture map.

Blending

This mode is available for one and two channels texture only. In the one-channel mode, it is used to blend the interpolated color with a constant color, $C_c$. This color is identified as Texture Environment Color in the OpenGL standard. Color and alpha are given by $$C_v=(1-L_t)\cdot C_f+L_t\cdot C_c$$

and $$A_v=A_f.$$

In the two-channel mode, it modifies alpha also:

$$A_v=A_t\cdot A_f$$

Although the system and method of the present invention has been described in connection with the described embodiments, it is not intended to be limited to the specific form set forth herein, but on the contrary, it is intended to cover such alternatives, modifications, and equivalents, as can be reasonably included within the spirit and scope of the invention as defined by the appended claims.

What is claimed is:

1. A method for storing texture maps in a multi-bank memory with more than two memory banks, the method comprising:

(a) reading a series of mip maps from a main system memory, wherein successive mip maps in said series have successively smaller sizes;

(b) classifying each mip map in said series as large or small based on the mip map's size with respect to a size limit;

(c) dividing each mip map of said series into a first portion and a second portion, wherein said first portion and said second portion of each mip map comprise triangular sections separated by a line u=v, wherein u is a horizontal axis for the mip map and v is a vertical axis for the mip map;

(d) storing the first portions of any two consecutive large mip maps of said series into distinct memory banks within the multi-bank memory;

(e) storing the second portions of any two consecutive large mip maps of said series into distinct memory banks, wherein the first portion and the second portion of large mip maps are stored in distinct memory banks of said multi-bank memory; and (f) storing the first and second portions of small mip maps, after a largest small mip map in said series, in a first memory bank of said multi-bank memory.

2. A method for storing texture maps in a multi-bank memory with at least two memory banks comprising:

(a) reading a series of mip maps from a main system memory, wherein successive mip maps in said series have successively smaller sizes;

(b) classifying each mip map in said series as large or small based on the mip map's size with respect to a size limit;

(c) dividing each mip map of said series into a first portion and a second portion;

(d) storing the first portions of any two consecutive large mip maps of said series into distinct memory banks within the multi-bank memory; and (e) storing the second portions of any two consecutive large mip maps of said series into distinct memory banks, wherein the first portion and the second portion of large mip maps are stored in distinct memory banks of said multi-bank memory;

(f) storing the first and second portions of small mip maps, after a largest small mip map in said series, in a first memory bank of said multi-bank memory.

3. The method as recited in claim 2, wherein the multi-bank memory comprises more than two memory banks, wherein (d) comprises storing the first portions of any three consecutive large mip maps of said series into the more than two memory banks in an alternating fashion.

4. The method as recited in claim 2, wherein said first portion and said second portion of each mip map comprise triangular sections separated by the line u=v, wherein u is a horizontal axis for the mip map and v is a vertical axis for the mip map.

5. The method as recited in claim 2, wherein said first portions correspond to the left halves of mip maps, and wherein said second portions correspond to the right halves of mip maps, wherein each mip map has a horizontal u-axis, and wherein each mip map is divided along the mip map's u-axis.

6. The method as recited in claim 2, wherein said first portions correspond to the top halves of mip maps, and wherein said second portions correspond to the bottom halves of mip maps, wherein each mip map has a vertical v-axis, and wherein each mip map is divided along the mip map's v-axis.

7. The method as recited in claim 2 further comprising:

storing the first portion and the second portion of the largest small mip map into distinct memory banks of the multi-bank memory.

8. A graphics subsystem comprising:

a multi-bank memory with at least two memory banks, wherein each of said memory banks comprises a plurality of memory pages;

a storing means for receiving and storing a series of mip maps, wherein successive mip maps of said series have successively smaller sizes, wherein each mip map of said series includes a first portion and a second portion, wherein the storing means is coupled to said multi-bank memory and is configured to (a) classify the mip maps of said series as large or small based on the mip maps' sizes with respect to a size limit, (b) store the first portions of any two consecutive large mip maps of said series in distinct memory banks of said multi-bank memory, (c) store the second portions of any two consecutive large mip maps of said series in distinct memory banks of said multi-bank memory, (d) store the first and second portions of small mip maps, after a first small mip map in said series, into a first memory bank of said multi-bank memory.

9. The graphics subsystem as recited in claim 8, wherein said multi-bank memory comprises more than two memory banks, wherein (d) comprises storing the first portions of any three consecutive large mip maps of said series into the more than two memory banks in an alternating fashion.

10. The graphics subsystem as recited in claim 8, wherein said first portion and said second portion of each mip map comprise triangular portions separated by the line u=v, wherein u is a horizontal axis for the mip map and v is a vertical axis for the mip map.

11. The graphics subsystem as recited in claim 8, wherein said first portions correspond to the left halves of mip maps, and wherein said second portions correspond to the right halves of mip maps, wherein each mip map is divided along the mip map's horizontal axis.

12. The graphics subsystem as recited in claim 8, wherein said first portions correspond to the top halves of mip maps, and wherein said second portions correspond to the bottom halves of mip maps, wherein each mip map is divided along the mip map's vertical axis.

13. The graphics subsystem as recited in claim 8, wherein the storing means is further configured to store the first and second portions of the first small mip map into distinct memory banks of said multi-bank memory.

14. A computer system comprising:

a central processing unit (CPU);

a main system memory coupled to said CPU; and a graphics subsystem coupled to said main system memory, wherein said graphics subsystem comprises:

a texture memory comprising at least two memory banks, and storage logic coupled between said texture memory and said main system memory, wherein said storage logic is configured to receive a series of mip maps from said main system memory, wherein successive mip maps of said series have successively smaller sizes, wherein the series of mip maps include large mip maps having sizes larger than a page and small mip maps having sizes less than or equal to a page, wherein the storage logic is configured to (a) split each of said large mip maps into a first portion and a second portion, (b) store the first portions of any two consecutive large mip maps into distinct memory banks of said texture memory, (c) store the second portions of any two consecutive large mip maps into distinct memory banks of said texture memory, (d) store small mip maps, after a first small mip map in said series, into a first memory bank of said texture memory.

15. The computer system as recited in claim 14, wherein the multi-bank memory comprises more than two memory banks, wherein (d) comprises storing the first portions of any three consecutive large mip maps of said series into the more than two memory banks in an alternating fashion.

16. The computer system as recited in claim 14, wherein the first portion and second portion of each mip map in said series are triangular areas separated by the line u=v, wherein u is a horizontal axis for the mip map and v is a vertical axis for the mip map.

17. The computer system as recited in claim 14, wherein said first portions correspond to the left halves of the mip maps, and wherein said second portions correspond to the right halves of the mip maps, wherein each mip map is divided along the mip map's v-axis.

18. The computer system as recited in claim 14, wherein said first portions correspond to the top halves of the mip maps, and wherein said second portions correspond to the bottom halves of the mip maps, wherein each mip map is divided along the mip map's u-axis.

19. The computer system as recited in claim 14, wherein said storing logic is further configured to split the first small mip map into a first portion and a second portions, and to store the first and second portions of the first small mip map into distinct memory banks of the multi-bank memory.

20. The computer system as recited in claim 14, wherein said texture memory is part of said main system memory.

21. A software program embodied on computer readable media comprising:
   a first plurality of instructions configured to read a mip map from a series of mip maps, wherein successive mip maps in the series have successively smaller sizes;
   a second plurality of instructions configured to classify each mip map of said series as large or small based on its size relative to a memory page size, and to divide each large mip map and a first small mip map of said series into a first portion and a second portion; and
   a third plurality of instructions configured to (a) store the first portions of any two consecutive mip maps of the series up to the first small mip map into distinct memory banks of a multi-bank memory, (b) store the second portions of any two consecutive mip maps of the series up to the first small mip map into distinct memory banks of a multi-bank memory, (c) store the small mip maps, after the first small mip map in the series, in a first memory bank of the multi-bank memory.

22. A graphics subsystem comprising:
   a multi-bank memory with at least two memory banks, wherein each of said memory banks comprises a plurality of memory pages;
   storage logic for receiving and storing a series of mip maps, wherein successive mip maps of said series have successively smaller sizes, wherein each mip map of said series includes a first portion and a second portion, wherein the storage logic is coupled to said multi-bank memory and is configured to (a) classify the mip maps of said series as large or small based on their sizes with respect to a size limit, (b) store the first portions of any two consecutive large mip maps of said series in distinct memory banks of said multi-bank memory, (c) store the second portions of any two consecutive large mip maps of said series in distinct memory banks of said multi-bank memory, (d) store the first and second portions of small mip maps, after a first small mip map in said series, into a first memory bank of said multi-bank memory.

23. The graphics subsystem as recited in claim 22, wherein said multi-bank memory comprises more than two memory banks, wherein (d) comprises storing the first portions of any three consecutive large mip maps of said series into the more than two memory banks in an alternating fashion.

24. The graphics subsystem as recited in claim 22, wherein said first portion and said second portion of each mip map comprise triangular portions separated by a line u=v, wherein u is a horizontal axis for the mip map and v is a vertical axis for the mip map.

25. The graphics subsystem as recited in claim 22, wherein said first portions correspond to the left halves of the mip maps, and wherein said second portions correspond to the right halves of the mip maps, wherein each mip map is divided along the mip map's u-axis.

26. The graphics subsystem as recited in claim 22, wherein said first portions correspond to the top halves of mip maps, and wherein said second portions correspond to the bottom halves of mip maps, wherein each mip map is divided along the mip map's v-axis.

27. The graphics subsystem as recited in claim 22, wherein the storage logic is further configured to store the first and second portions of the first small mip map into distinct memory banks of said multi-bank memory.

* * * * *